United States Patent
Kashiwagi et al.

(10) Patent No.: US 10,570,050 B2
(45) Date of Patent: Feb. 25, 2020

(54) SOOT DEPOSITION BODY MANUFACTURING APPARATUS AND MANUFACTURING METHOD

(71) Applicant: Shin-Etsu Chemical Co., Ltd., Tokyo (JP)

(72) Inventors: Yusuke Kashiwagi, Ibaraki (JP); Tomihisa Yanaga, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 101 days.

(21) Appl. No.: 15/675,802

(22) Filed: Aug. 14, 2017

(65) Prior Publication Data
US 2018/0050951 A1 Feb. 22, 2018

(30) Foreign Application Priority Data
Aug. 16, 2016 (JP) .................. 2016-159630

(51) Int. Cl.
C03B 37/014 (2006.01)
C03B 37/018 (2006.01)
C03B 19/14 (2006.01)

(52) U.S. Cl.
CPC .... *C03B 37/01493* (2013.01); *C03B 19/1423* (2013.01); *C03B 19/1492* (2013.01); *C03B 2207/54* (2013.01); *C03B 2207/62* (2013.01); *C03B 2207/66* (2013.01); *C03B 2207/81* (2013.01)

(58) Field of Classification Search
CPC ............... C03B 37/01493; C03B 37/01853
See application file for complete search history.

(56) References Cited

U.S. PATENT DOCUMENTS 4,568,370 A * 2/1986 Powers ................. C03B 37/014
65/403

FOREIGN PATENT DOCUMENTS

JP 2003-165738 A 6/2003

* cited by examiner

*Primary Examiner* — Cynthia Szewczyk

(57) ABSTRACT

Provided is a manufacturing apparatus for manufacturing a soot deposition body, including a main burner that deposits glass microparticles on a target rod while moving parallel to a longitudinal direction of the target rod; and a side burner that is positioned outside of a movement range of the main burner in a movement direction of the main burner, and fires an end portion of the soot deposition body formed on the target rod. The side burner includes a plurality of heating burners arranged distanced from each other in a circumferential direction of the target rod. In the manufacturing apparatus described above, the main burner may include a plurality of deposition burners that are arranged distanced from each other in the circumferential direction of the target rod.

6 Claims, 11 Drawing Sheets

SOOT DEPOSITION BODY MANUFACTURING APPARATUS AND MANUFACTURING METHOD

The contents of the following patent Japanese application are incorporated herein by reference:

Japanese Patent Application NO. 2016-159630 filed on Aug. 16, 2016.

BACKGROUND

1. Technical Field

The present invention relates to a soot deposition body manufacturing apparatus and manufacturing method.

2. Related Art

There is technology for, when forming a soot deposition body through an optical fiber base material manufacturing process, preventing soot pealing by which a portion of the soot deposition body peels away by arranging side burners near the ends of the deposition body and firing the soot deposition body at these portions, as shown in Patent Document 1, for example.

Patent Document 1: Japanese Patent Application Publication No. 2003-165738

There are cases where microparticles that are deposited at positions farther outward than the side burners peel off and fall away.

SUMMARY

According to a first aspect of the present invention, provided is a manufacturing apparatus for manufacturing a soot deposition body, comprising a main burner that deposits glass microparticles on a target rod while moving parallel to a longitudinal direction of the target rod; and a side burner that is positioned outside of a movement range of the main burner in a movement direction of the main burner, and fires an end portion of the soot deposition body formed on the target rod. The side burner includes a plurality of heating burners arranged distanced from each other in a circumferential direction of the target rod.

According to a second aspect of the present invention, provided is a manufacturing method for manufacturing a soot deposition body, comprising depositing glass microparticles on a target rod with a main burner that moves parallel to a longitudinal direction of the target rod; and firing an end portion of the soot deposition body formed on the target rod with a side burner that is positioned outside of a movement range of the main burner in a movement direction of the main burner. The side burner includes a plurality of heating burners arranged distanced from each other in a circumferential direction of the target rod.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
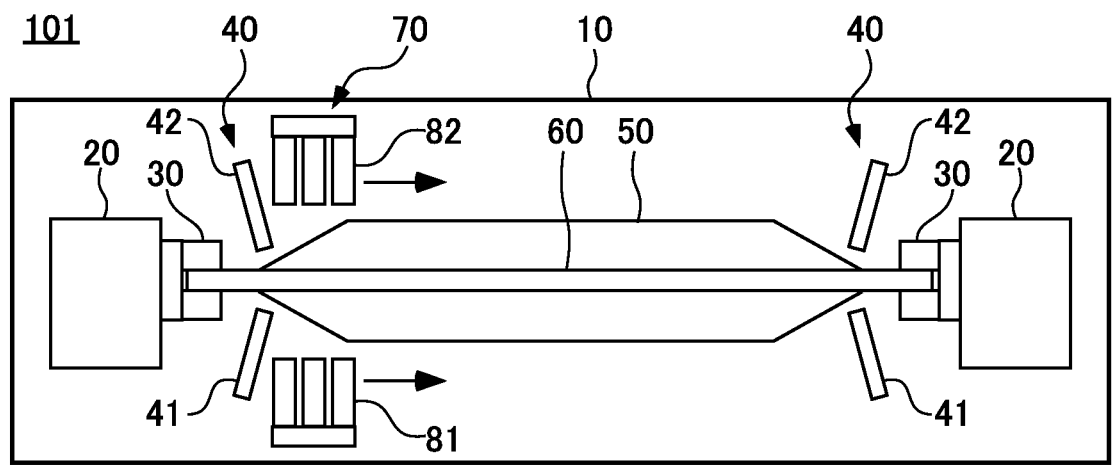
FIG. 1 is a schematic horizontal cross-sectional view of the manufacturing apparatus 101 in a plane parallel to the target rod 60.

FIG. 1 is a schematic horizontal cross-sectional view of an exemplary manufacturing apparatus 101 for manufacturing a soot deposition body. The manufacturing apparatus 101 includes a chamber 10, rotating mechanisms 20, chucks 30, side burners 40, and a main burner 70.

A rotating mechanism 20 and a chuck 30 are arranged near each longitudinal end inside the chamber 10. Each chuck in the pair of chucks is supported to be rotatable relative to the chamber 10, and the chucks 30 grip the target rod 60 at both ends. The rotating mechanisms 20 respectively rotate the chucks 30 to rotate the target rod 60 gripped by the chucks 30.

The main burner 70 includes a first deposition burner 81 and a second deposition burner 82. The first deposition burner 81 and the second deposition burner 82 are arranged facing the target rod 60 respectively at positions symmetrical to a vertical plane including the target rod 60 held by the chucks 30. The first deposition burner 81 and the second deposition burner 82 each include three burner nozzles, and generate glass microparticles to be deposited on the target rod 60 held by the chucks 30 when a raw material gas is supplied.

The main burner 70 moves parallel to an extension direction of the target rod 60. Accordingly, the main burner 70 deposits the glass microparticles while moving along the longitudinal direction of the target rod 60 between the chucks 30, and generates the soot deposition body 50 with the target rod 60 as a central axis.

The main burner 70 is supplied with a raw material gas such as $SiCl_4$, along with $H_2$, $O_2$, and $N_2$ gases, for example, and the glass microparticles generated through a hydrolytic reaction are deposited on the target rod 60. In this way, the soot deposition body 50 is formed through outside vapor deposition. The formed soot deposition body is made transparent through sintering, and becomes a cladding layer.

The side burners 40 are arranged respectively at the ends of the movement range of the main burner 70. Each side burner 40 includes a pair of heating burners 41 and 42 arranged symmetrically with respect to the vertical plane including the target rod 60. The heating burners 41 and 42 heat the regions near both ends of the soot deposition body 50 formed on the target rod 60, separately from the main burner 70.

Figure 2:
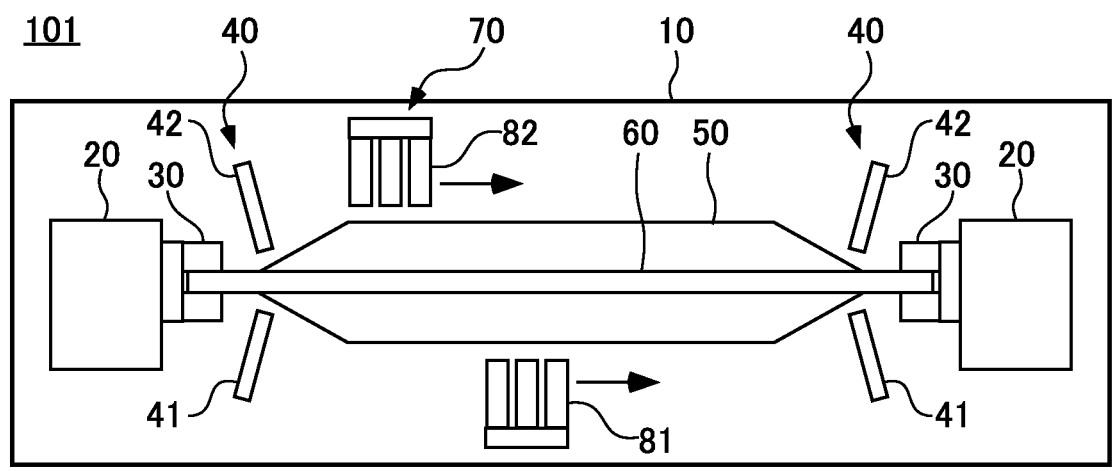
FIG. 2 is a schematic horizontal cross-sectional view of the manufacturing apparatus 101 in a plane parallel to the target rod 60.

FIG. 2 is a schematic horizontal cross-sectional view of the manufacturing apparatus 101 in a plane parallel to the target rod 60. FIG. 2 shows a state in which the manufacturing apparatus 101 operates while the glass microparticles are deposited on the target rod 60 by the main burner 70.

As shown in the drawing, the first deposition burner 81 and the second deposition burner 82 included in the main burner 70 can move parallel to the extension direction of the target rod 60 independently from each other. Accordingly, by moving the second deposition burner 82 somewhat later than the first deposition burner 81, for example, a time lag occurs in the timing at which the glass microparticles are deposited on the target rod 60 from each burner. In this way, the flame generated from the first deposition burner 81 and the flame generated from the second deposition burner 82 can be prevented from interfering with each other and causing a drop in the deposition speed.

In consideration of avoiding interference between the flames, the supply of the raw material gas may be stopped during the return paths of the deposition burners, and the interference between flames of burners passing by each other may be avoided. Furthermore, when such control is performed, the movement speed of a deposition burner on the return path may be made higher than the movement speed on the forward path, thereby restricting the decrease in the deposition speed.

Figure 3:
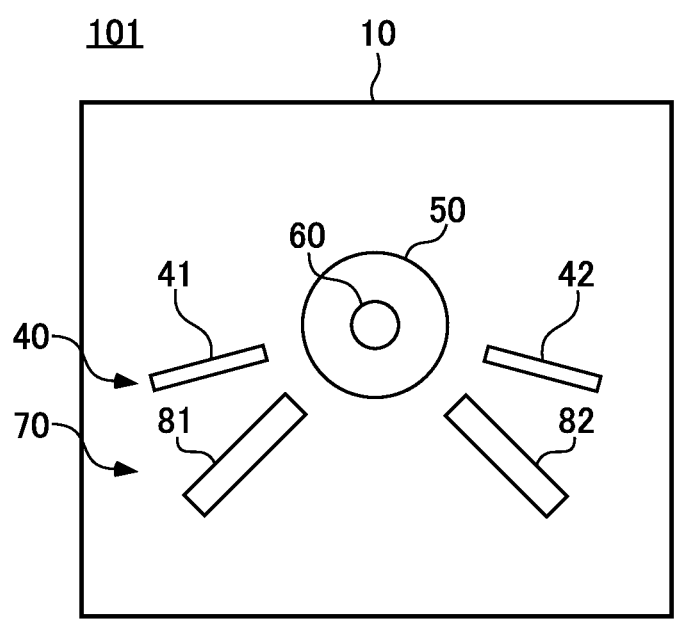
FIG. 3 is a schematic vertical cross-sectional view of the manufacturing apparatus 101 in a plane orthogonal to the target rod 60.

FIG. 3 is a schematic vertical cross-sectional view of the manufacturing apparatus 101 as seen from a longitudinal direction end side of the chamber 10. As shown in the drawing, the heating burners 41 and 42 of the side burner 40 and also the first deposition burner 81 and second deposition burner 82 of the main burner 70 are arranged with distance therebetween in the circumferential direction of the target rod 60. Furthermore, the set of heating burners 41 and 42 of the side burner 40 and the set of the first deposition burner 81 and second deposition burner 82 of the main burner 70 are each arranged to be symmetrical with respect to a vertical line passing through the target rod 60.

In the manufacturing apparatus 101 such as described above, it is possible to deposit the glass microparticles substantially uniformly in the circumferential direction of the target rod 60 and form the soot deposition body 50, by depositing the glass microparticles generated by the main burner 70 while rotating the target rod 60 held by the chucks 30 using the rotating mechanisms 20. Furthermore, it is possible to move the main burner 70 in the longitudinal direction of the target rod 60 to deposit the glass microparticles substantially uniformly in the longitudinal direction of the target rod 60 and to form the soot deposition body 50 substantially uniformly in the longitudinal direction of the target rod 60 as well, as described above, while depositing the glass microparticles with the main burner 70.

In the manufacturing apparatus 101, the first deposition burner 81 and the second deposition burner 82 are arranged in the region where the interval between the heating burners 41 and 42 is narrow in the circumferential direction of the target rod 60. In this way, by arranging the main burner 70 to be surrounded by the side burners 40, the side burners 40 perform heating without a drop in the temperature of the glass microparticles generated by the main burner 70 and attached to the target rod 60, and therefore the end portions of the soot deposition body 50 are efficiently fired.

If there is a portion with low density in the soot deposition body 50 at the end portions of the soot deposition body 50 deposited on the target rod 60, i.e. at the borders between the segment where the soot deposition body 50 is present and the segments where the soot deposition body 50 is not present on the target rod 60, there are cases where soot peeling occurs and a portion of the soot deposition body 50 peels off. When transparent vitrification is performed by sintering the soot deposition body 50 in a state where soot peeling has occurred, cracking occurs from the portion where the soot peeling occurred, and it becomes impossible to use the soot deposition body 50 as an optical fiber base material. However, by firing the end portions of the soot deposition body 50 with the side burners 40, it is possible to increase the density at the end portions of the soot deposition body 50 and restrict the occurrence of soot peeling.

The side burners 40 emit flames for heating from the pair of heating burners 41 and 42 arranged in a manner to sandwich the target rod 60 at each end portion of the soot deposition body 50. Therefore, since the heating flames go around the entire circumference of the target rod 60, the glass microparticles generated by the main burner 70 trap the glass microparticles attempting to flow farther outward than the side burners 40, and the glass microparticles can be prevented from attaching to the target rod 60. In this way, in the manufacturing apparatus 101 the glass microparticles attached to the target rod 60 farther outside than the side burner 40 are also prevented from falling off.

In this way, in the manufacturing apparatus 101, the side burners 40 each including the plurality of heating burners 41 and 42 are arranged to enable heating of both ends of the soot deposition body 50 in the longitudinal direction. Therefore, it is possible to prevent soot peeling by increasing the density at both ends of the soot deposition body 50, and also to restrict glass microparticles from attaching to the heated regions due to the side burners 40 in the target rod 60. In this way, it is possible to manufacture an optical fiber base material that does not include any cracks and in which it is difficult for cracks to form.

Figure 4:
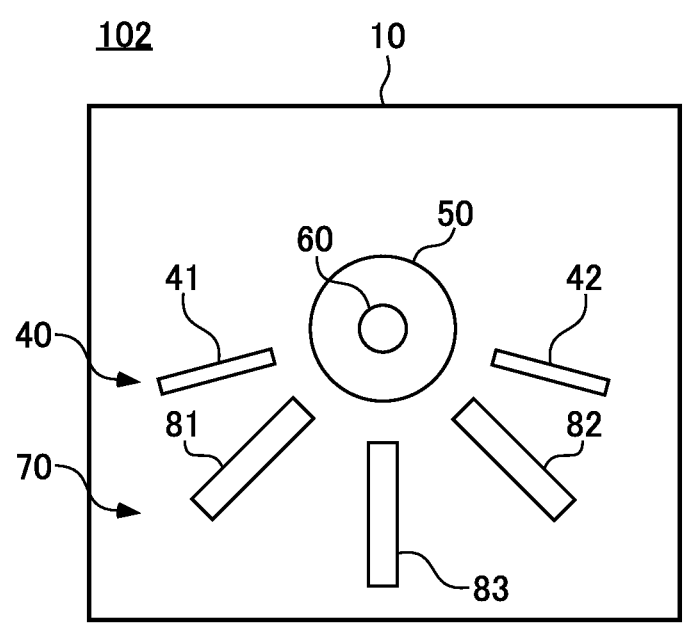
FIG. 4 is a schematic vertical cross-sectional view of the manufacturing apparatus 102 in a plane orthogonal to the target rod 60.

FIG. 4 is a schematic vertical cross-sectional view of the configuration of another manufacturing apparatus 102, as seen from the same viewpoint as in FIG. 3. The manufacturing apparatus 102 in this drawing has the same structure as the manufacturing apparatus 101 shown in FIGS. 1 and 2, aside from the portions described in the following. Accordingly, elements common to both are given the same reference numerals and redundant descriptions are omitted.

The manufacturing apparatus 102 has a structure differing from that of the manufacturing apparatus 101 by having a third deposition burner 83 added to the main burner 70. The added third deposition burner 83 is arranged between the first deposition burner 81 and the second deposition burner 82 in the circumferential direction of the target rod 60. Accordingly, in the main burner 70, the intervals between the first deposition burner 81, the second deposition burner 82, and the third deposition burner 83 become narrower in the circumferential direction of the target rod 60 and the amount of glass microparticles that can be supplied by the main burner 70 per unit time is increased.

In the manufacturing apparatus 102 as well, the main burner 70 is arranged to be sandwiched between the heating burners 41 and 42 of the side burner 40 in the circumferential direction of the target rod 60. In this way, the soot deposition body 50 that is deposited on the target rod 60 by the main burner 70 is fired by the side burners 40 at both ends thereof, and the soot peeling is restricted. Furthermore, at the regions near both ends of the target rod 60, the flames of the side burners 40 prevent the glass microparticles from being deposited farther outward than the side burners 40.

Figure 5:
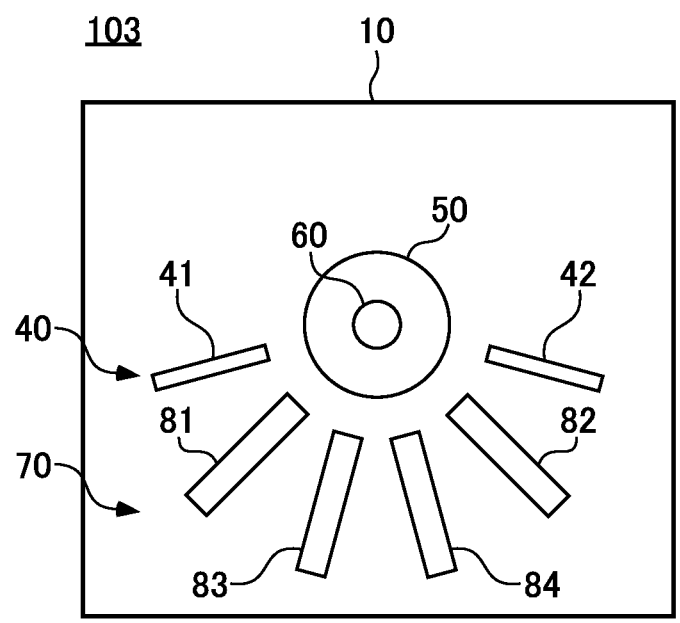
FIG. 5 is a schematic vertical cross-sectional view of the manufacturing apparatus 103 in a plane orthogonal to the target rod 60.

FIG. 5 is a schematic vertical cross-sectional view of the configuration of another manufacturing apparatus 103, as seen from the same viewpoint as in FIG. 4. The manufacturing apparatus 103 in this drawing has the same structure as the manufacturing apparatus 102 shown in FIG. 4, aside from having a fourth deposition burner 84 added thereto. Accordingly, elements common to both are given the same reference numerals and redundant descriptions are omitted.

The added fourth deposition burner 84 is arranged along with the third deposition burner 83 at uniform intervals between the first deposition burner 81 and the second deposition burner 82 in the circumferential direction of the target rod 60. Accordingly, in the main burner 70 of the manufacturing apparatus 103, the intervals between the first deposition burner 81, the second deposition burner 82, the third deposition burner 83, and the fourth deposition burner 84 become even narrower in the circumferential direction of the target rod 60 than those of the manufacturing apparatus 102 and the amount of glass microparticles that can be supplied by the main burner 70 per unit time is also increased.

In the manufacturing apparatus 103 as well, the main burner 70 is arranged to be sandwiched between the heating burners 41 and 42 of the side burner 40 in the circumferential direction of the target rod 60. In this way, the soot deposition body 50 that is deposited on the target rod 60 by the main burner 70 is fired by the side burners 40 at both ends thereof, and the soot peeling is restricted. Furthermore, at the regions near both ends of the target rod 60, the flames of the side burners 40 block the glass microparticles and the glass microparticles are prevented from being deposited farther outward than the side burners 40.

Figure 6:
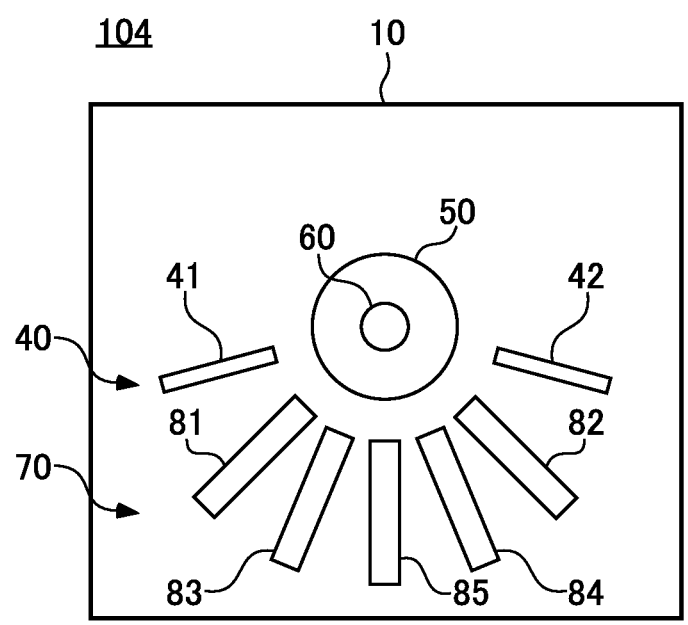
FIG. 6 is a schematic vertical cross-sectional view of the manufacturing apparatus 104 in a plane orthogonal to the target rod 60.

FIG. 6 is a schematic vertical cross-sectional view of the configuration of another manufacturing apparatus 104, as seen from the same viewpoint as in FIG. 5. The manufacturing apparatus 104 in this drawing has the same structure as the manufacturing apparatus 103 shown in FIG. 5, aside from having a fifth deposition burner 85 added thereto. Accordingly, elements common to both are given the same reference numerals and redundant descriptions are omitted.

The added fifth deposition burner 85 is arranged along with the third deposition burner 83 and the fourth deposition burner 84 at uniform intervals between the first deposition burner 81 and the second deposition burner 82 in the circumferential direction of the target rod 60. Accordingly, in the main burner 70 of the manufacturing apparatus 104, the intervals between the first deposition burner 81, the second deposition burner 82, the third deposition burner 83, the fourth deposition burner 84, and the fifth deposition burner 85 become even narrower in the circumferential direction of the target rod 60 than those of the manufacturing apparatus 103 and the amount of glass microparticles that can be supplied by the main burner 70 per unit time is also increased.

In the manufacturing apparatus 104 as well, the main burner 70 is arranged to be sandwiched between the heating burners 41 and 42 of the side burner 40 in the circumferential direction of the target rod 60. In this way, the soot deposition body 50 that is deposited on the target rod 60 by the main burner 70 is fired by the side burners 40 at both ends thereof, and the soot peeling is restricted. Furthermore, at the regions near both ends of the target rod 60, the flames of the side burners 40 are blocked and the glass microparticles are prevented from being deposited farther outward than the side burners 40.

In this way, by increasing the number of deposition burners 81, 82, 83, 84, and 85 forming the main burner 70, it is possible to increase the deposition speed of the glass microparticles and improve the producibility of the soot deposition body 50. Furthermore, even when the number of deposition burners forming the main burner 70 is increased, by forming the side burners 40 with the heating burners 41 and 42 arranged in a manner to sandwich and surround the main burner 70, it is possible to efficiently fire both ends of the soot deposition body 50 formed on the target rod 60 and to restrict the soot peeling. Furthermore, since the flames of the heating burners 41 and 42 are emitted from both sides of the target rod 60, the glass microparticles deposited on the target rod 60 from the main burner 70 are prevented from being deposited farther outward than the flames of the side burners 40.

In the manner described above, by forming each pair of the heating burners 41 and 42 in each side burner 40, the effect of restricting the soot peeling is realized, and furthermore, when the manufactured soot deposition body 50 is large-scale, the number of heating burners forming the side burners 40 may be further increased. It should be noted that the target rod 60 is easier to soften when there is excessive heating by the heating burners, but there is also an increase in the fuel consumption, and therefore increasing the number of heating burners is not preferable.

Figure 7:
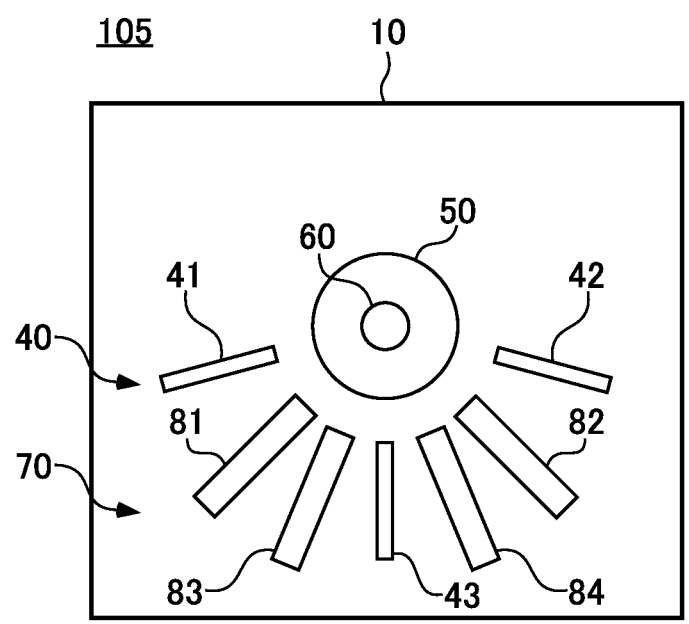
FIG. 7 is a schematic vertical cross-sectional view of the manufacturing apparatus 105 in a plane orthogonal to the target rod 60.

FIG. 7 is a schematic vertical cross-sectional view of the configuration of another manufacturing apparatus 105, as seen from the same viewpoint as in FIG. 6. The manufacturing apparatus 105 in this drawing has the same structure as the manufacturing apparatus 104 shown in FIG. 6, aside from having a third heating burner 43 added to the side burner 40 and not including the fifth deposition burner 85 in the main burner 70. Accordingly, elements common to both are given the same reference numerals and redundant descriptions are omitted.

With a structure such as described above, in the manufacturing apparatus 105, the ratio of heating burners 41, 42, and 43 to the deposition burners (81, 82, 83, and 84) forming the main burner 70 is relatively increased. Therefore, it is possible to efficiently heat and fire both ends of the formed soot deposition body 50. Furthermore, since the intervals between the heating burners 41, 42, and 43 become narrower, deposition of the glass microparticles farther outward than the segment sandwiched by the side burners 40 in the longitudinal direction of the target rod 60 can be more effectively prevented.

Figure 8:
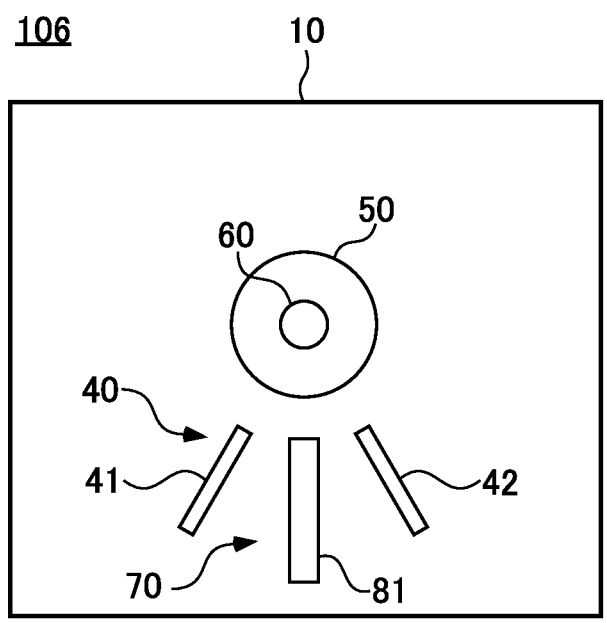
FIG. 8 is a schematic vertical cross-sectional view of the manufacturing apparatus 106 in a plane orthogonal to the target rod 60.

FIG. 8 is a schematic vertical cross-sectional view of the configuration of another manufacturing apparatus 106, as seen from the same viewpoint as in FIGS. 3 to 6. The manufacturing apparatus 106 in this drawing has the same structure as any one of the manufacturing apparatuses 101, 102, 103, and 104 shown in FIGS. 3 to 6, aside from including a main burner 70 formed by a single first deposition burner 81 and, as seen in the viewpoint of the drawing, a side burner 40 formed by a pair of heating burners 41 and 42 arranged symmetrically with the first deposition burner 81 as a center. Accordingly, elements common to both are given the same reference numerals and redundant descriptions are omitted.

With a structure such as described above, in the manufacturing apparatus 106, it is possible to heat the glass microparticles generated by the main burner 70 deposited on the target rod 60 with extremely high efficiency. Furthermore, it is possible to reliably trap the floating glass microparticles generated by the main burner 70, and to reliably prevent these glass microparticles from attaching to the target rod 60 farther outward than the segment sandwiched by the side burners 40.

In FIG. 8, an example is shown of a combination of a single first deposition burner 81 and a pair of heating burners 41 and 42, but a plurality of such combinations may be provided to form the manufacturing apparatus 106. In this way, it is possible to realize high standards for the deposition efficiency of the main burner 70 and the crack prevention by the side burner 40.

Figure 9:
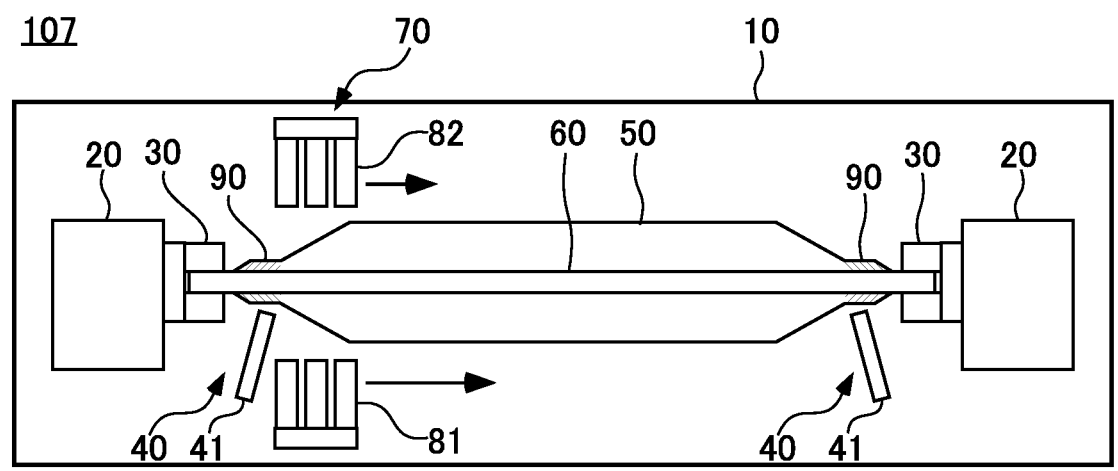
FIG. 9 is a schematic horizontal cross-sectional view of the manufacturing apparatus 107 in a plane parallel to the target rod 60.

FIG. 9 is a schematic vertical cross-sectional view of manufacturing apparatus 107 serving as a comparative example, from the same viewpoint as in FIG. 1. In order to be compared to the manufacturing apparatuses 101, 102, 103, and 104 that are the embodiments, the manufacturing apparatus 107 has the same structure as the manufacturing apparatus 101 shown in FIGS. 1, 2, and 3 aside from each side burner 40 being formed by a single heating burner 41. Accordingly, elements common to both are given the same reference numerals and redundant descriptions are omitted.

Figure 10:
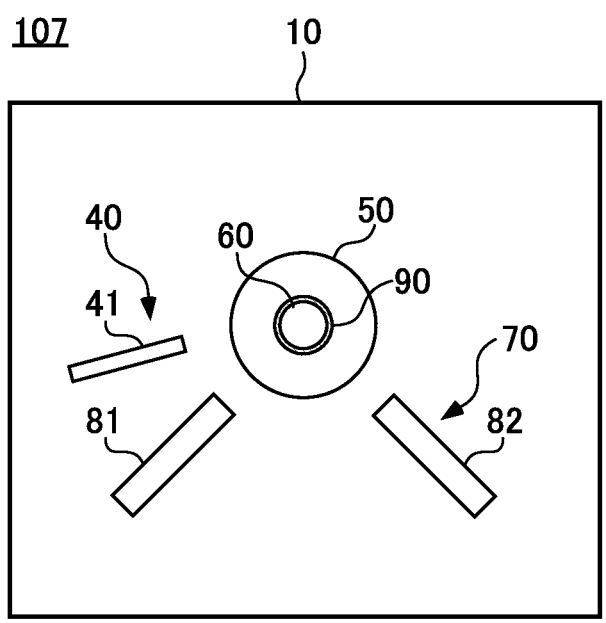
FIG. 10 is a schematic vertical cross-sectional view of the manufacturing apparatus 107 in a plane orthogonal to the target rod 60.

FIG. 10 is a schematic vertical cross-sectional view of the manufacturing apparatus 107 as seen from the same viewpoint as in FIG. 3. As shown in the drawing, in the manufacturing apparatus 107, the side burner 40 is formed from a single heating burner 41. On the other hand, the main burner 70 includes a pair of burners that are the first deposition burner 81 and the second deposition burner 82.

In the manufacturing apparatus 107, at the end surface shown in the drawing, the single heating burner 41 is arranged near the first deposition burner 81. In other words, the heating burner 41 is arranged at a position distanced from the second deposition burner 82. In this way, when the glass microparticles generated from the first deposition burner 81 are deposited on the target rod 60, the heating and firing are performed efficiently by the heating burner 41. Furthermore, the floating glass microparticles generated from the first deposition burner 81 without being deposited on the target rod 60 are trapped in the flame of the heating burner 41, and are prevented from being deposited on the target rod 60 farther outward than the side burner 40.

However, in the manufacturing apparatus 107, the heating burner 41 is positioned far from the glass microparticles generated from the second deposition burner 82, and therefore the heating efficiency for the glass microparticles generated by the first deposition burner 81 is relatively decreased. Furthermore, in the manufacturing apparatus 107, since the heating burner 41 is distanced from the second deposition burner 82, when the second deposition burner 82 reaches the end portion of the movement range, a portion of the flame including glass microparticles expands farther outward than the side burner 40 without being blocked by the flame of the heating burner 41, and a low-density soot deposition body 90 that is not fired is formed at the end portion of the target rod 60.

Figure 11:
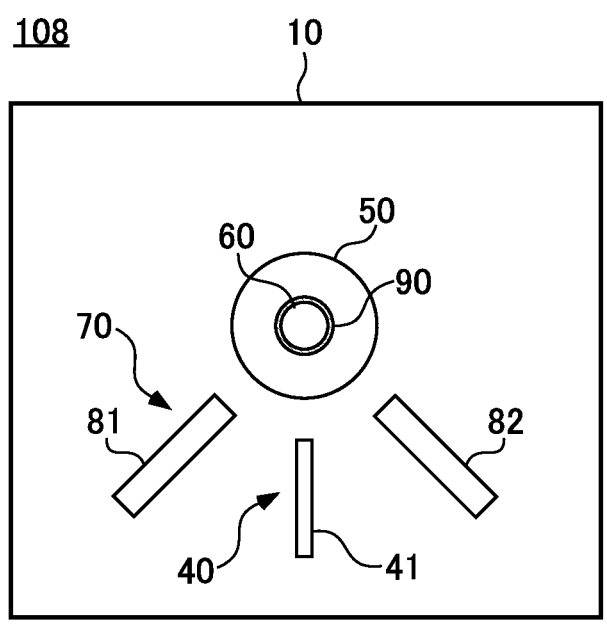
FIG. 11 is a schematic vertical cross-sectional view of the manufacturing apparatus 108 in a plane orthogonal to the target rod 60.

FIG. 11 is a schematic vertical cross-sectional view of another manufacturing apparatus 108 in a plane orthogonal to the target rod 60. The manufacturing apparatus 108 has the same structure as the manufacturing apparatus 107 shown in FIGS. 9 and 10, aside from the heating burner 41, the first deposition burner 81, and the second deposition burner 82 having the positional relationship shown in the plane of the drawing.

In the manufacturing apparatus 108, the single heating burner 41 is arranged at the substantial center between the first deposition burner 81 and the second deposition burner 82. Accordingly, the intervals between the heating burner 41 and the first deposition burner 81 and second deposition burner 82 are substantially equal, and the glass microparticles generated by either deposition burner are heated by substantially the same amount by the heating burner 41.

However, the glass microparticles generated from either one of the first deposition burner 81 and the second deposition burner 82 are heated by the side burner in a relatively short time when attaching to the target rod 60. However, the glass microparticles generated from the other one of the first deposition burner 81 and the second deposition burner 82 and attached to the target rod 60 are heated by the side burner 40 after the target rod 60 rotates almost one time. Due to this difference in conditions, the density becomes uneven near the end portions of the soot deposition body 50 formed on the target rod 60.

Furthermore, as seen when viewed from the viewpoint shown in FIG. 11, with the single heating burner 41, although one side of the circumferential surface of the target rod 60 is heated, not enough of the flame moves around to the back side of this circumferential surface. Therefore, some of the glass microparticles generated by the main burner 70 float outward beyond the segment sandwiched by the side burners 40 in the longitudinal direction of the target rod 60 and are deposited on the target rod 60. Therefore, the low-density soot deposition body 90 having low density is formed near both ends of the target rod 60.

The low-density soot deposition body 90 itself has low density, and has weak attachment force with respect to the target rod 60. Furthermore, the low-density soot deposition body 90 is not fired by the side burner 40 after formation. Therefore, soot peeling occurs when the deposition amount is increased and the weight becomes greater.

In this way, when a combination of side burners 40 formed by single heating burners 41 are used for a main burner 70 having a plurality of deposition burners, it is unavoidable for there to be deposition burners at wide intervals from the side burners 40 when the main burner 70 reaches the end portions of the movement range. Therefore, there are cases where the firing by the side burners 40 is insufficient at the end portions of the soot deposition body 50. Furthermore, a portion of the glass microparticles are deposited farther outward than the side burners 40 in the longitudinal direction of the target rod 60, and the low-density soot deposition body 90 is formed without these regions being fired by the side burners 40.

In other words, by forming the side burners 40 to have a plurality of heating burners 41 and 42 arranged distanced from each other in the circumferential direction of the target rod 60, it is possible to restrict the occurrence of soot peeling even when the number of deposition burners forming the main burner 70 is increased. Accordingly, it is possible to improve the producibility of the optical fiber base material by improving the deposition speed of the glass microparticles due to the increase in deposition burners.

As described above, when performing manufacturing with the manufacturing apparatus 108 in which the side burners 40 are formed by arranging one heating burner 41 in each at both ends of the soot deposition body 50, cracking occurred in the soot deposition body 50 formed by depositing 80% to 100% by mass of the product mass. In the soot deposition bodies 50 manufactured using the manufacturing apparatus 101 shown in FIGS. 1 to 3, there was absolutely no occurrence of the cracking described above.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

LIST OF REFERENCE NUMERALS

10: chamber, 20: rotating mechanism, 30: chuck, 40: side burner, 41, 42, 43: heating burner, 50: soot deposition body, 60: target rod, 70: main burner, 81: first deposition burner, 82: second deposition burner, 83: third deposition burner, 84: fourth deposition burner, 85: fifth deposition burner, 90: low-density soot deposition body, 101, 102, 103, 104, 107, 108: manufacturing apparatus

What is claimed is:

1. A manufacturing apparatus for manufacturing a soot deposition body, comprising:
    a main burner that deposits glass microparticles to form the soot deposition body, on a target rod while moving parallel to a longitudinal direction of the target rod; and
    a side burner that is positioned outside of a movement range of the main burner in a movement direction of the main burner, wherein
    the side burner includes a plurality of heating burners that are arranged distanced from each other in a circumferential direction of the target rod and fires an end portion of the soot deposition body formed by the main burner on the target rod, and
    the plurality of heating burners do not deposit glass microparticles.

2. The manufacturing apparatus according to claim 1, wherein
    the main burner includes a plurality of deposition burners that are arranged distanced from each of the deposition burners in the circumferential direction of the target rod and that each deposit glass microparticles on the target rod while moving parallel to the longitudinal direction of the target rod.

3. The manufacturing apparatus according to claim 2, wherein
    the main burner includes at least two and no more than five deposition burners.

4. The manufacturing apparatus according to claim 1, wherein
    a plurality of side burners are arranged respectively at ends of the movement range, and
    at least one of the side burners includes a pair of heating burners that are arranged distanced from each other.

5. The manufacturing apparatus according to claim 4, wherein
    the main burner is arranged between the pair of heating burners on whichever side has a narrower interval therebetween, in the circumferential direction of the target rod.

6. A manufacturing method for manufacturing a soot deposition body, comprising:
    depositing glass microparticles to form the soot deposition body, on a target rod with a main burner that moves parallel to a longitudinal direction of the target rod; and
    firing an end portion of the soot deposition body formed by the main burner on the target rod with a side burner that is positioned outside of a movement range of the main burner in a movement direction of the main burner, the side burner including a plurality of heating burners arranged distanced from each other in a circumferential direction of the target rod, wherein
    the plurality of heating burners do not deposit glass microparticles.

* * * * *